US012625008B2

(12) United States Patent
Kakuyama et al.

(10) Patent No.: US 12,625,008 B2
(45) Date of Patent: May 12, 2026

(54) OPTICAL SENSOR

(71) Applicant: Sumitomo Electric Industries, Ltd., Osaka (JP)

(72) Inventors: Kyohei Kakuyama, Osaka (JP); Masahiro Adachi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 341 days.

(21) Appl. No.: 18/293,773

(22) PCT Filed: Mar. 22, 2022

(86) PCT No.: PCT/JP2022/013029
§ 371 (c)(1),
(2) Date: Jan. 30, 2024

(87) PCT Pub. No.: WO2023/013148
PCT Pub. Date: Feb. 9, 2023

(65) Prior Publication Data
US 2025/0003803 A1 Jan. 2, 2025

(30) Foreign Application Priority Data
Aug. 3, 2021 (JP) ................................ 2021-127417

(51) Int. Cl.
*G01J 5/12* (2006.01)

(52) U.S. Cl.
CPC ..................................... *G01J 5/12* (2013.01)

(58) Field of Classification Search
CPC .... G01J 5/12; G01J 5/0853; G01J 1/02; G01J 5/08
See application file for complete search history.

(56) References Cited

U.S. PATENT DOCUMENTS

| | | | | |
|---|---|---|---|---|
| 8,664,510 | B2 * | 3/2014 | Ojima | G01J 5/0853 |
| | | | | 136/239 |
| 2003/0118076 | A1 | 6/2003 | Schieferdecker et al. | |
| 2012/0139074 | A1 * | 6/2012 | Abe | H10F 30/223 |
| | | | | 257/E27.123 |
| 2018/0090658 | A1 * | 3/2018 | Kasahara | H10N 19/101 |
| 2020/0035894 | A1 * | 1/2020 | Kryskowski | H10N 10/851 |

(Continued)

FOREIGN PATENT DOCUMENTS

| | | | | | |
|---|---|---|---|---|---|
| DE | 102012203792 | A1 * | 9/2013 | ................ | G01J 5/02 |
| JP | H09-092892 | A | 4/1997 | | |
| JP | 2003-177064 | A | 6/2003 | | |

(Continued)

*Primary Examiner* — Laura Martin
*Assistant Examiner* — Julia Fitzpatrick
(74) *Attorney, Agent, or Firm* — XSENSUS LLP

(57) ABSTRACT
An optical sensor includes a support layer, a thermoelectric conversion material portion including a first material layer and a second material layer, and a light-absorbing film. The first material layer includes a first region and a second region overlapping the light-absorbing film. The second material layer includes a third region and a fourth region overlapping the light-absorbing film. The thermoelectric conversion material portion includes transition regions electrically connecting the first region and the third region, and the second region and the fourth region, respectively, and including a halogen.

9 Claims, 10 Drawing Sheets

(56)                    References Cited

U.S. PATENT DOCUMENTS

2020/0052178  A1 *    2/2020  Shibata ................. H10N 10/80
2022/0155141  A1      5/2022  Hirose et al.

FOREIGN PATENT DOCUMENTS

| | | | | | |
|---|---|---|---|---|---|
| JP | 2014-501913 | A | | 1/2014 | |
| KR | 20180010059 | A | * | 1/2018 | ................ G01J 5/18 |
| WO | 2013/006151 | A2 | | 1/2013 | |
| WO | WO-2013173450 | A1 | * | 11/2013 | ........... H10F 77/488 |
| WO | 2020/213569 | A1 | | 10/2020 | |
| WO | WO-2021006034 | A1 | * | 1/2021 | ............. H10F 77/60 |

* cited by examiner

OPTICAL SENSOR

CROSS-REFERENCE TO RELATED APPLICATION

This application is based on PCT filing PCT/JP2022/013029, filed Mar. 22, 2022, which claims priority from Japanese Patent Application No. 2021-127417, filed Aug. 3, 2021, the entire contents of each are incorporated herein by reference.

TECHNICAL FIELD

The present disclosure relates to an optical sensor.

BACKGROUND ART

There is known a thermopile in which two types of materials forming a thermocouple are alternately joined in series and pad electrodes for wire bonding made of a material different from thermocouple materials are connected to the thermocouple materials so as to overlap the thermocouple materials. According to the PTL 1, an intermediate layer made of a conductive material different from the thermocouple materials of the thermocouple and the pad electrodes for wire bonding is interposed between the thermocouple materials and the pad electrodes for wire bonding.

CITATION LIST

Patent Literature

PTL 1: Japanese Unexamined Patent Application Publication No. 9-92892

SUMMARY OF INVENTION

An optical sensor according to the present disclosure includes, a support layer having a first main surface and a second main surface opposite to the first main surface, a first electrode disposed on the first main surface, a second electrode spaced from the first electrode and disposed on the first main surface, a thermoelectric conversion material portion disposed on the first main surface, a heat sink disposed on the second main surface, and a light-absorbing film configured to convert received light into thermal energy. The thermoelectric conversion material portion includes a plurality of first material layers that each have an elongated shape, are each made of SiGe having a first conductivity type, and are each configured to convert thermal energy into electric energy, a plurality of second material layers that each have an elongated shape, are made of SiGe having a second conductivity type different from the first conductivity type, and are configured to convert thermal energy into electric energy, and a plurality of transition regions containing a halogen. Each of the plurality of first material layers includes, a first region including a first end portion and a second region including a second end portion located opposite to the first end portion. The second region overlaps the light-absorbing film when viewed in a direction perpendicular to the first main surface. Each of the plurality of second material layers includes, a third region including a third end portion and a fourth region including a fourth end portion located opposite to the third end portion. The fourth region overlaps the light-absorbing film when viewed in the direction perpendicular to the first main surface. The plurality of transition regions electrically connect the first region and the third region to each other and the second region and the fourth region to each other. The thermoelectric conversion material portion is formed such that each of the plurality of first material layers and each of the plurality of second material layers are electrically connected to each other in series in an alternate manner. The first region at a front end of the thermoelectric conversion material portion is electrically connected to the first electrode. And the third region at a tail end of the thermoelectric conversion material portion is electrically connected to the second electrode.

DETAILED DESCRIPTION

Figure 1:
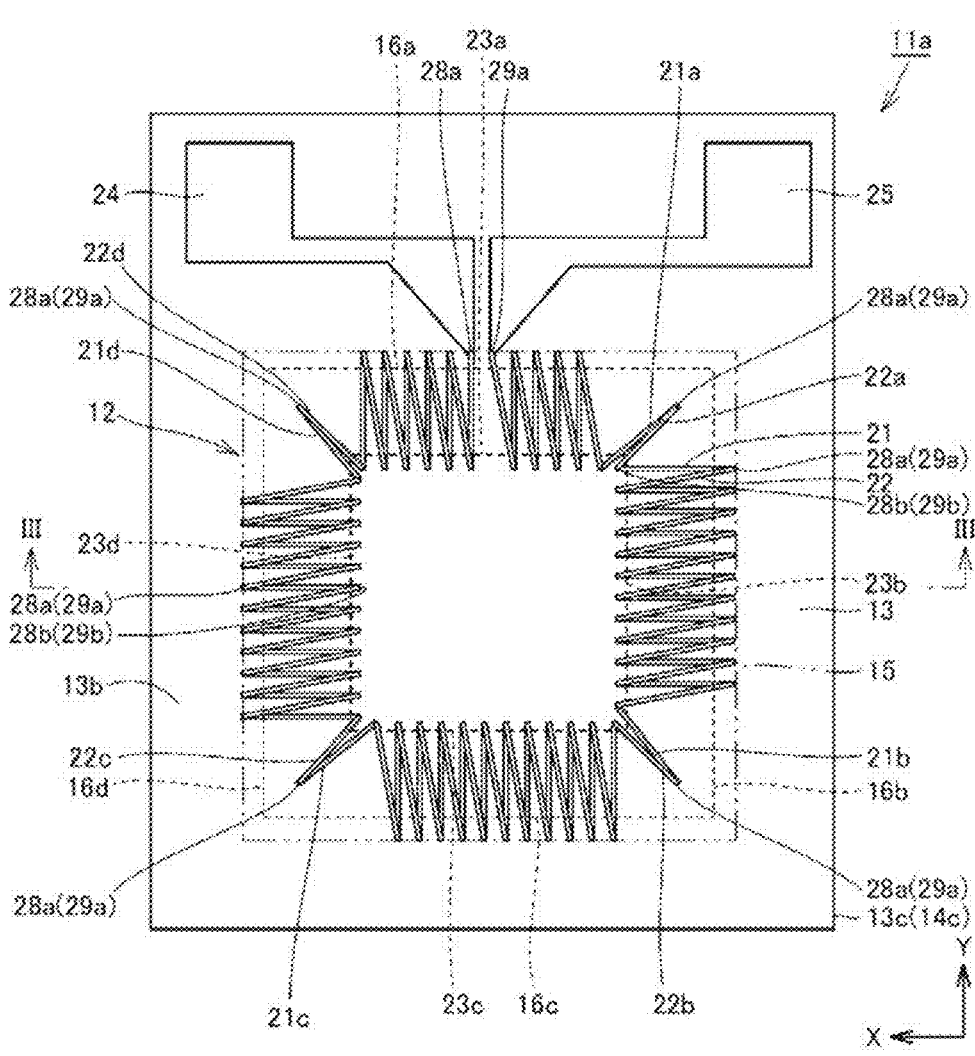
FIG. 1 is a schematic plan view of an appearance of an optical sensor according to a first embodiment.

Problems to be Solved by Present Disclosure

In an optical sensor such as a thermopile type infrared sensor, reduction in a noise is required from a viewpoint of improvement in sensitivity of the sensor. It is difficult for the technique disclosed in PTL 1 to meet such a demand.

Therefore, an object of the present disclosure is to provide an optical sensor in which the noise can be reduced.

Advantageous Effects of Present Disclosure

According to the optical sensor described above, noise can be reduced.

DESCRIPTION OF EMBODIMENTS OF PRESENT DISCLOSURE

First, embodiments of the present disclosure will be listed and explained. An optical sensor according to the present disclosure includes, a support layer having a first main surface and a second main surface opposite to the first main surface, a first electrode disposed on the first main surface, a second electrode spaced from the first electrode and disposed on the first main surface, a thermoelectric conversion material portion disposed on the first main surface, a heat sink disposed on the second main surface, and a light-absorbing film configured to convert received light into thermal energy. The thermoelectric conversion material portion includes a plurality of first material layers that each have an elongated shape, are each made of SiGe having a first conductivity type, and are each configured to convert thermal energy into electric energy, a plurality of second material layers that each have an elongated shape, are made of SiGe having a second conductivity type different from the first conductivity type, and are configured to convert thermal energy into electric energy, and a plurality of transition regions containing a halogen. Each of the plurality of first material layers includes, a first region including a first end portion and a second region including a second end portion located opposite to the first end portion. The second region overlaps the light-absorbing film when viewed in a direction perpendicular to the first main surface. Each of the plurality of second material layers includes, a third region including a third end portion and a fourth region including a fourth end portion located opposite to the third end portion. The fourth region overlaps the light-absorbing film when viewed in the direction perpendicular to the first main surface. The plurality of transition regions electrically connect the first region and the third region to each other and the second region and the fourth region to each other. The thermoelectric conversion material portion is formed such that each of the plurality of first material layers and each of the plurality of second material layers are electrically connected to each other in series in an alternate manner. The first region at a front end of the thermoelectric conversion material portion is electrically connected to the first electrode. And the third region at a tail end of the thermoelectric conversion material portion is electrically connected to the second electrode.

A thermopile-type optical sensor using a thermoelectric conversion material that converts a temperature difference (thermal energy) into electric energy, such as an infrared sensor, may include a light receiving section such as a light-absorbing film that converts optical energy into thermal energy, and a thermoelectric conversion material portion (thermopile) that converts the temperature difference into electric energy. In the thermoelectric conversion material portion, a thermocouple formed by connecting a p-type thermoelectric conversion material portion and an n-type thermoelectric conversion material portion is used. A plurality of p-type thermoelectric conversion material portions and a plurality of n-type thermoelectric conversion material portions are alternately connected to each other in series to increase an output. A resistance in the optical sensor is expressed by the following equation 1. Hereinafter, resistance means electrical resistance.

$$R = (R_p + R_n) \times N + 2\rho_c \times N \qquad \text{[Equation 1]}$$

R denotes a resistance. $R_p$ denotes a resistance per p-type thermoelectric conversion material portion, $R_n$ denotes a resistance per n-type thermoelectric conversion material portion, N denotes the number of pairs, and $\rho_c$ denotes a contact resistance, that is, a resistance at portions where the p-type thermoelectric conversion material portions and the n-type thermoelectric conversion material portions are electrically connected to each other. As can be understood from this equation, if contact resistance $\rho_c$ can be reduced, the resistance in the optical sensor can be reduced. The noise in the optical sensor is expressed by the following equation 2.

$$V_n = (4k \times T \times R \times \Delta f)^{1/2} \qquad \text{[Equation 2]}$$

Vn represents a Johnson noise (V), k represents a Boltzmann constant (J/K). T represents a temperature (K), R represents a resistance (A), and $\Delta f$ represents a bandwidth (Hz=1/s). As can be understood from this equation, the Johnson noise depends on the resistance, and if the resistance can be reduced, the noise in the optical sensor can be reduced.

The present inventors have made intensive studies to reduce a resistance at portions where first material layers and second material layers are in contact with each other. Then, it was found that when the first material layers and the second material layers are formed, thick naturaloxide films formed on surface layers of the material layers inhibit carrier transport and increase resistance. Therefore, the present inventors have focused on a viewpoint that the increase in resistance due to the thick naturaloxide films is suppressed to improve conductivity, and have arrived at the configuration of the present disclosure.

In the optical sensor of the present disclosure, the thermoelectric conversion material portion includes the transition regions that electrically connect the first region and the third region to each other and the second region and the fourth region to each other, and contain a halogen. The transition region may be a layer having a thickness and transitioning. In addition, the transition region may be an interface. According to such a configuration, the halogen can be caused to function as a dopant to improve a carrier density in the transition region. Accordingly, it is possible to reduce the resistance of the portion where the first material layer and the second material layer are electrically connected to each other, thereby reducing the noise of the optical sensor.

In the above optical sensor, when viewed in the direction perpendicular to the first main surface, the first region and the third region may overlap each other, and the second region and the fourth region may overlap each other. The transition regions may be disposed in contact with the first region, the second region, the third region, and the fourth region. Here, the transition region refers to, for example, the region where transition occurs between an n-type SiGe and a p-type SiGe. In this way, it is possible to reduce the resistance between the first material layer and the second material layer, thereby reducing the noise of the optical sensor.

In the above optical sensor, the thermoelectric conversion material portion may include a plurality of third material layers made of a metal. When viewed in the direction perpendicular to the first main surface, the first region and the third region may be disposed so as to be adjacent to each other, and the second region and the fourth region may be disposed so as to be adjacent to each other. The plurality of transition regions may be disposed in contact with the first region, the second region, the third region, and the fourth region. The plurality of third material layers, when viewed in the direction perpendicular to the first main surface, may connect the first region and the third region to each other so as to span the first region and the third region, and may connect the second region and the fourth region to each other so as to span the second region and the fourth region. Here, the transition region refers to, for example, the region where transition occurs between the third material layer and the n-type SiGe and between the third material layer and the p-type SiGe. In this way, the conductivity between the first material layer and the second material layer can be improved by the third material layer having good conductivity. Therefore, the noise of the optical sensor can also be reduced by such a configuration.

In the above optical sensor, a content ratio of the halogen in the plurality of transition regions may be $1.0 \times 10^{16}$ atoms/$cm^3$ to $5.0 \times 10^{22}$ atoms/$cm^3$. As described above, by setting the content ratio of the halogen in the plurality of transition region to be $1.0 \times 10^{16}$ atoms/$cm^3$ or more, the amount as a dopant used for reducing the resistance can be sufficiently secured. In addition, by setting to $5.0 \times 10^{22}$ atoms/$cm^3$ or less, a contact resistivity of SiGe can be reduced.

In the above optical sensor, each of the plurality of transition regions may have a thickness of 0.1 nm to 2 nm. In this way, the thickness of the transition region can be made more appropriate, and the noise of the optical sensor can be reduced more reliably. Noted that, it is more preferable when the thickness of the transition region is 0.1 nm to 1.0 nm.

In the above optical sensor, the halogen may be fluorine. By using such an element as the halogen, the resistance of the portion where the first material layer and the second material layer are electrically connected to each other can be more reliably reduced. Therefore, the noise can be reduced more reliably.

In the above optical sensor, the SiGe having the first conductivity type and the SiGe having the second conductivity type may be each a polycrystal. The SiGe which is such a polycrystal is also suitably utilized in the optical sensor of the present disclosure. The crystallization rate of the polycrystal in the present disclosure is 99% or more.

In the above optical sensor, the SiGe having the first conductivity type and the SiGe having the second conductivity type may have at least one of a nanocrystalline structure or an amorphous structure. By using the SiGe forming the first material layer and the second material layer, the noise of the optical sensor can be reduced more reliably.

In the above optical sensor, the plurality of transition regions may include an oxide film of the SiGe having the first conductivity type or an oxide film of the SiGe having the second conductivity type. This eliminates the need for deposition of a new material for forming the transition region, thereby simplifying the manufacturing process and improving the yield.

DETAILS OF EMBODIMENTS OF PRESENT DISCLOSURE

Next, an embodiment of the optical sensor of the present disclosure will be described with reference to drawings. In the following drawings, the same or corresponding portions are denoted by the same reference numerals and the description thereof will be omitted.

First Embodiment

Figure 2:
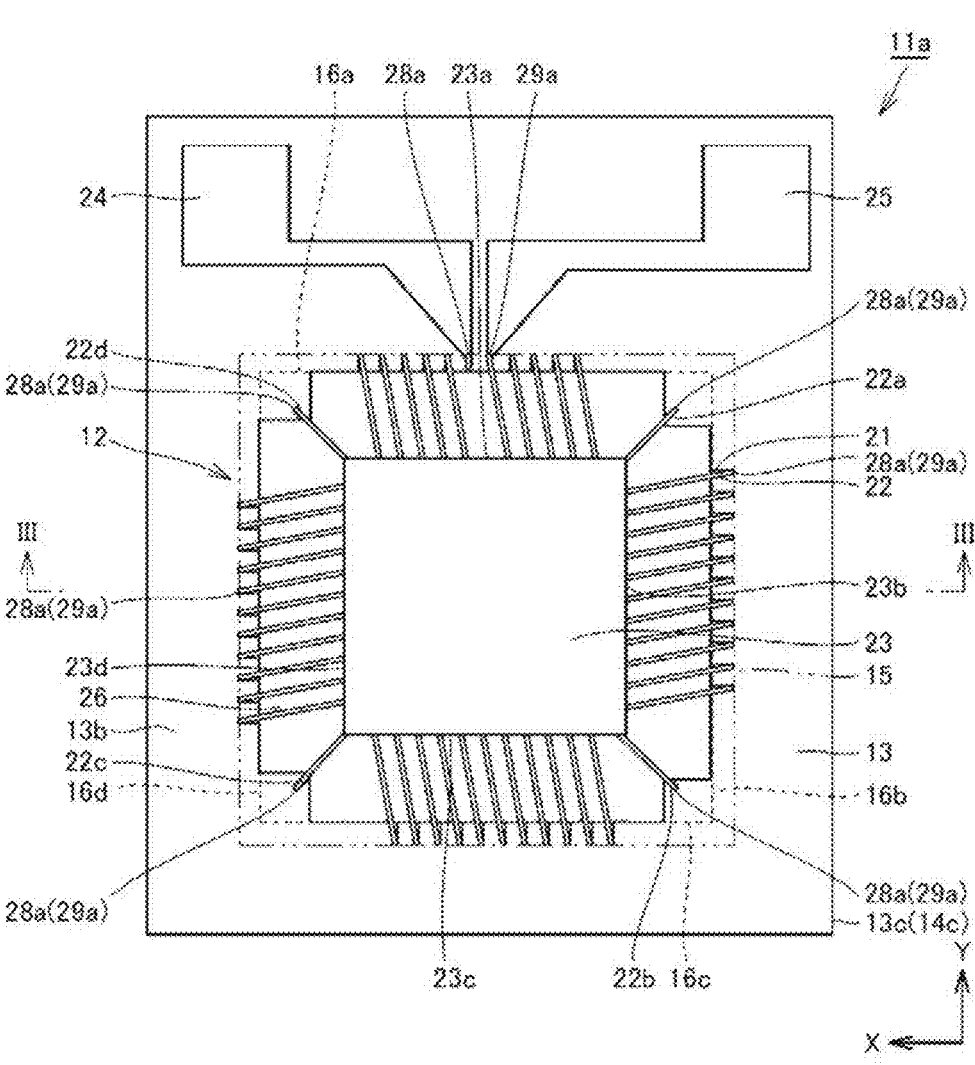
FIG. 2 is a schematic plan view of an appearance of the optical sensor according to the first embodiment.
Figure 3:
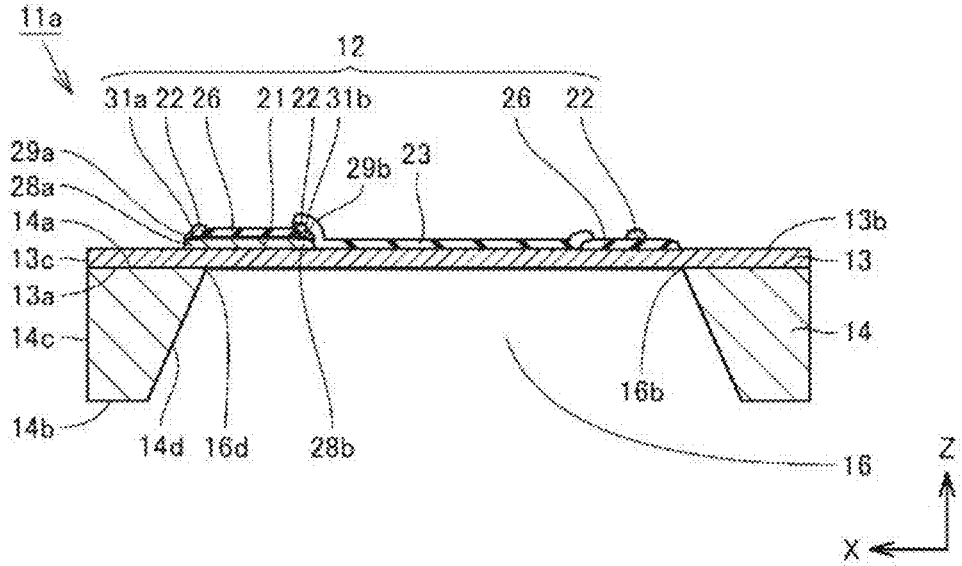
FIG. 3 is a schematic cross-sectional view showing a cross section along line III-III of FIGS. 1 and 2.
Figure 4:
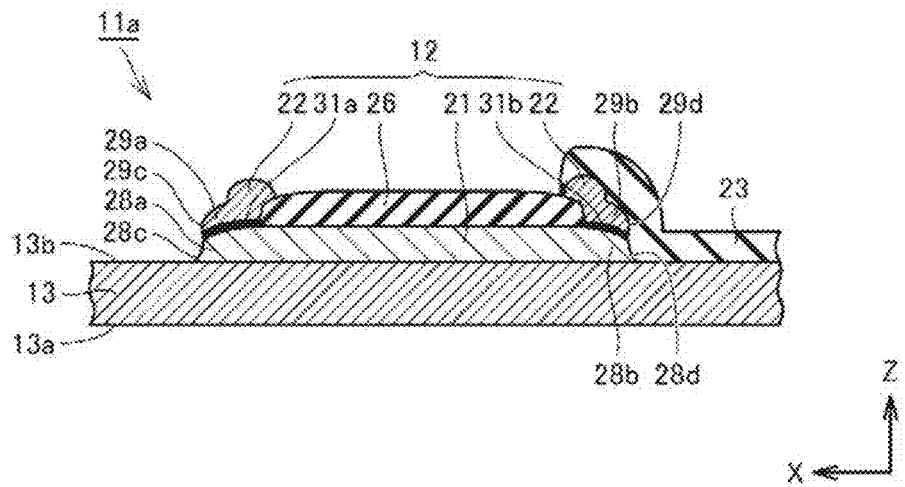
FIG. 4 is a schematic cross-sectional view showing a portion of the optical sensor according to the first embodiment.
Figure 5:
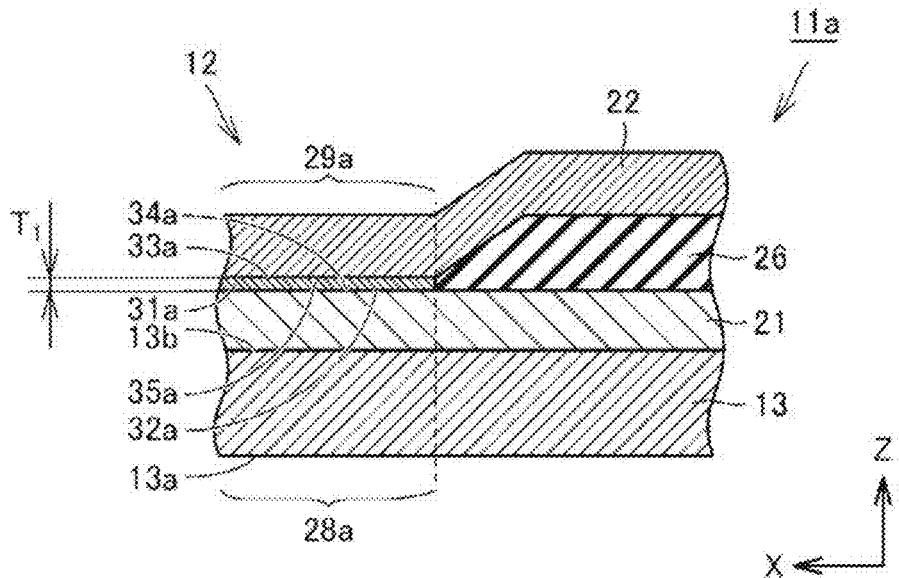
FIG. 5 is an enlarged schematic cross-sectional view of a portion of the optical sensor shown in FIG. 4.

An optical sensor 11a according to a first embodiment of the present disclosure will be described. FIGS. 1 and 2 are schematic plan views of appearances of optical sensor 11a according to the first embodiment. For ease of understanding, an infrared-absorbing film 23 and an insulating film 26 are not shown in FIG. 1. In FIG. 1, an outer edge where infrared-absorbing film 23 is disposed is indicated by a dashed line. FIG. 3 is a schematic cross-sectional view showing a cross section along line III-III of FIGS. 1 and 2. FIG. 4 is a schematic cross-sectional view showing a portion of optical sensor 11a according to the first embodiment. FIG. 4 is an enlarged schematic cross-sectional view of a portion including a first region 28a, a second region 28b, a third region 29a, and a fourth region 29b. FIG. 5 is an enlarged schematic cross-sectional view of the portion of optical sensor 11a shown in FIG. 4.

Referring to FIGS. 1, 2, 3, 4 and 5, optical sensor 11a is, for example, an infrared sensor. Optical sensor 11a includes a support layer 13, a thermoelectric conversion material portion 12 disposed on a first main surface 13b of support layer 13, a heat sink 14, infrared-absorbing film 23 as a light-absorbing film, a first electrode 24, and a second electrode 25. Thermoelectric conversion material portion 12 includes a plurality of a first material layers 21 (21a, 21b, 21c, and 21d) and a plurality of second material layers 22 (22a, 22b, 22c, and 22d). Optical sensor 11a detects an electrical potential difference generated between first electrode 24 and second electrode 25 to detect an infrared ray irradiated to optical sensor 11a. When the entire optical sensor 11a has a plate-like shape, a thickness direction thereof is represented by a Z-axis direction (direction perpendicular to first main surface 13b).

Support layer 13 is a thin film and has a rectangular shape when viewed in the Z-axis direction. Support layer 13 supports thermoelectric conversion material portion 12 including the plurality of first material layers 21 and the plurality of second material layers 22, infrared-absorbing film 23, first electrode 24, and second electrode 25. Support layer 13 is formed of, for example, a $SiO_2/SiN/SiO_2$ film. That is, support layer 13 has a configuration in which $SiO_2$, SiN, and $SiO_2$ are stacked.

An outer edge 14c which is an outer edge of the entire heat sink 14 and an outer edge 13c of support layer 13 extend continuously in the Z-axis direction. Heat sink 14 includes one surface 14a and another surface 14b which are spaced apart from each other in the Z-axis direction. Heat sink 14 is disposed on a second main surface 13a of support layer 13. Specifically, in heat sink 14, one surface 14a of heat sink 14 and second main surface 13a of support layer 13 are in contact with each other. Another surface 14b of heat sink 14 is exposed. In the present embodiment, heat sink 14 has a shape with the inside hollowed out. Heat sink 14 is represented by two trapezoidal shapes in the cross section shown in FIG. 3. Heat sink 14 is sufficiently thick compared to support layer 13. For example, heat sink 14 has a thickness of 10 times or more the thickness of support layer 13. Heat sink 14 is a so-called substrate. Heat sink 14 is formed of, for example, Si.

A recess 16 which is recessed in the Z-axis direction is formed in optical sensor 11a. In a region corresponding to recess 16 when viewed from a side of surface 14b, support layer 13, specifically, second main surface 13a of support layer 13 is exposed. An inner circumferential surface 14d of heat sink 14 surrounding recess 16 has a so-called tapered shape in which an opening is wider at a position closer to surface 14b. Recess 16 is formed by, for example, anisotropic wet etching of a flat plate-like substrate. When such recess 16 is formed, heat escape from infrared-absorbing film 23 to heat sink 14 can be suppressed. Therefore, it is possible to further increase a temperature difference in longitudinal directions of first material layer 21 and second material layer 22 which will be described later.

In FIG. 1, inner edges 16a, 16b, 16c, and 16d of heat sink 14, which are boundaries between heat sink 14 and support layer 13, are indicated by dashed lines in FIG. 1. As shown in FIG. 1, in the present embodiment, inner edges 16a, 16b. 16c, and 16d of heat sink 14 have a square shape when viewed in the Z-axis direction.

First material layer 21 is formed of SiGe having an n-type which is a first conductivity type. That is, first material layer 21 is formed of an n-type thermoelectric conversion material, and is formed of a compound semiconductor containing Si (silicon) and Ge as constituent elements.

First material layer 21 has an elongated shape. First material layer 21 has first region 28a including a first end portion 28c and second region 28b including a second end portion 28d located opposite to first end portion 28c in the longitudinal direction. A direction in which a line connecting first region 28a and second region 28b extends is the longitudinal direction of first material layer 21 having the elongated shape. First material layer 21 converts a temperature difference between first region 28a and second region 28b into electric energy. First material layer 21 is disposed in contact with first main surface 13b of support layer 13. In first material layer 21, when viewed in the Z-axis direction, first region 28a is located closer to inner edges 16a, 16b, 16c, and 16d of heat sink 14, and second region 28b is located closer to outer edges 23a, 23b, 23c, and 23d of infrared-absorbing film 23.

Second material layer 22 is formed of SiGe having a p-type which is a conductivity type different from the first conductivity type. That is, second material layer 22 is formed of a p-type thermoelectric conversion material, and is formed of a compound semiconductor containing Si and Ge as constituent elements.

Second material layer 22 has an elongated shape. Second material layer 22 has third region 29a including a third end portion 29c and fourth region 29b including a fourth end portion 29d located opposite to third end portion 29c in a longitudinal direction. A direction in which a line connecting third region 29a and fourth region 29b extends is the longitudinal direction of second material layer 22 having the elongated shape. Second material layer 22 converts a temperature difference between third region 29a and fourth region 29b into electric energy. In the present embodiment, second material layer 22 is disposed on a portion of insulating film 26 that is disposed in contact with support layer 13 and on a portion of first material layer 21. In second material layer 22, when viewed in the Z-axis direction, third region 29a is located closer to inner edges 16a, 16b, 16c, and 16d of heat sink 14, and fourth region 29b is located closer to outer edges 23a, 23b, 23c, and 23d of infrared-absorbing film 23.

When viewed in the Z-axis direction, the plurality of first material layers 21 and the plurality of second material layers 22 are located inside a region 15 having a rectangular shape indicated by a two-dot chain line in FIG. 1. Thermoelectric conversion material portion 12 converts the temperature difference (thermal energy) into electric energy by using the plurality of first material layers 21 and the plurality of second material layers 22. Thermoelectric conversion material portion 12 includes insulating film 26. For example, $SiO_2$ is selected as a material of insulating film 26. An arrangement of the plurality of first material layers 21 and the plurality of second material layers 22 will be described in detail later.

Infrared-absorbing film 23 is disposed on first main surface 13b of support layer 13, on a portion of first material layer 21, on a portion of second material layer 22, and on a portion of insulating film 26. Infrared-absorbing film 23 is disposed in such a manner as to form the temperature difference in the longitudinal direction of first material layer 21, that is, between first region 28a and second region 28b. Infrared-absorbing film 23 is disposed to in such a manner as to form the temperature difference in the longitudinal direction of second material layer 22, that is, between third region 29a and fourth region 29b. Specifically, infrared-absorbing film 23 exposes first region 28a and third region 29a, and covers second region 28b and fourth region 29b. Infrared-absorbing film 23 is disposed in a region surrounded by inner edges 16a, 16b, 16c, and 16d of heat sink 14 when viewed in the Z-axis direction. Infrared-absorbing film 23 having outer edges 23a, 23b, 23c, and 23d has a square shape when viewed in the Z-axis direction. Infrared-absorbing film 23 is disposed in such a manner that a center of the square shape formed by outer edges 23a, 23b, 23c, and 23d of infrared-absorbing film 23 and a center of the square shape formed by inner edges 16a. 16b, 16c, and 16d of heat sink 14 overlap each other when viewed in the Z-axis direction. Infrared-absorbing film 23 converts an infrared ray into heat. Carbon (C) is selected as a material of infrared-absorbing film 23, for example.

An arrangement of thermoelectric conversion material portion 12 and infrared-absorbing film 23 will be described. Insulating film 26 is disposed on a portion of first material layer 21 and on a portion of first main surface 13b. Insulating film 26 does not cover first region 28a or second region 28b of first material layer 21. Second material layer 22 is disposed on a portion of first main surface 13b, on a portion of insulating film 26, and on transition regions 31. First region 28a of first material layer 21 and third region 29a of second material layer 22 are electrically connected to each other. Second region 28b of first material layer 21 and fourth region 29b of second material layer 22 are electrically connected to each other. Third region 29a overlaps first region 28a when viewed in the Z-axis direction. Fourth region 29b overlaps second region 28b when viewed in the Z-axis direction.

Infrared-absorbing film 23 is disposed on a portion of first main surface 13b, on a portion of insulating film 26, and on a portion of second material layer 22. Infrared-absorbing film 23 exposes first region 28a of first material layer 21 and third region 29a of second material layer 22. Infrared-absorbing film 23 covers second region 28b of first material layer 21 and fourth region 29b of second material layer 22. That is, second region 28b and fourth region 29b overlap infrared-absorbing film 23 in the Z-axis direction. First region 28a of first material layer 21 and third region 29a of second material layer 22 are not covered with infrared-absorbing film 23. That is, each of first material layer 21 and second material layer 22 is thermally connected to infrared-absorbing film 23 in such a manner as to form the temperature difference in the longitudinal directions of first material layer 21 and second material layer 22. Heat generated by infrared-absorbing film 23 is transferred to second region 28b of first material layer 21 and fourth region 29b of second material layer 22. In this manner, the temperature differences are formed in the longitudinal directions of first material layer 21 and second material layer 22. In this manner, it is possible to obtain optical sensor 11a in which the temperature difference formed by infrared-absorbing film 23 and heat sink 14 is efficiently utilized.

The arrangements of the plurality of first material layers 21 and the plurality of second material layers 22 will be described. The plurality of first material layers 21 are disposed so as to be spaced apart from each other. Except for first material layers 21a, 21b, 21c, and 21d, each of the plurality of first material layers 21 is disposed in such a manner that the longitudinal direction thereof is parallel to the X-axis direction or the Y-axis direction. Except for first material layers 21a, 21b, 21c, and 21d formed at the corners, each of the plurality of first material layers 21 is disposed in such a manner as to extend from each side of region 15 having a square shape toward the opposite side of region 15 (in such a manner that the longitudinal direction is parallel to the direction). First material layers 21 and second material layers 22 are alternately connected to each other electrically, except for first region 28a connected to first electrode 24 and third region 29a connected to second electrode 25. Specifically, second region 28b and fourth region 29b, first region 28a and third region 29a are electrically connected to each other. That is, adjacent first material layers 21 and second material layers 22 are electrically connected to each other in series in an alternate manner.

A polarity of a voltage generated in first region 28a and a polarity of a voltage generated in third region 29a are opposite to each other with respect to a direction of a temperature gradient generated when optical sensor 11a is irradiated with light. First material layer 21 disposed at a front end of thermoelectric conversion material portion 12 is electrically connected to first electrode 24 at first region 28a. Second material layer 22 disposed at a tail end of thermoelectric conversion material portion 12 is electrically connected to second electrode 25 at third region 29a. First electrode 24 and second electrode 25 are disposed outside region 15 when viewed in the Z-axis direction. First electrode 24 and second electrode 25 are disposed so as to be spaced apart from each other. Each of first electrode 24 and second electrode 25 is, for example, a pad electrode. Materials used for first electrode 24 and second electrode 25 include, for example, gold (Au), titanium (Ti), platinum (Pt) and the like.

Thermoelectric conversion material portion 12 includes transition regions 31 (31a and 31b) containing a halogen. Transition region 31a electrically connects first region 28a and third region 29a to each other. Transition region 31b electrically connects second region 28b and fourth region 29b to each other. Transition region 31a is disposed between first region 28a and third region 29a so as to be in contact with each region. Transition region 31b is disposed between second region 28b and fourth region 29b so as to be in contact with each region. Transition region 31 contains a halogen, for example, fluorine (F).

Transition region 31 includes an oxide film of SiGe. That is, transition region 31 is formed of the oxide film of SiGe containing fluorine. A content ratio of fluorine in transition region 31 is $1.0 \times 10^{16}$ atoms/cm³ to $5.0 \times 10^{22}$ atoms/cm³.

A thickness $T_1$ of transition region 31a is 0.1 nm to 2 nm (see FIG. 5). Thickness $T_1$ of transition region 31a is represented by thickness $T_1$ which is a length between a back surface 32a and a front surface 33a of transition region 31a in the Z-axis direction. Back surface 32a of transition region 31a is in contact with a front surface 34a of first region 28a. Front surface 33a of transition region 31a is in contact with a back surface 35a of third region 29a. Since a thickness of transition region 31b is comparable to the thickness of transition region 31a, the description thereof will be omitted.

A method of manufacturing optical sensor 11a according to the first embodiment will be briefly described. First, a flat substrate is prepared, and support layer 13 is formed on the substrate. At this time, the substrate is in contact with second main surface 13a of support layer 13. Next, first material layers 21 are formed on first main surface 13b of support layer 13. Specifically, first material layers 21 are formed as follows. First, a lift-off resist is applied in a layer on first main surface 13b. Next, a positive-type resist is applied in a layer on the lift-off resist. Thereafter, the positive-type resist is exposed by photolithography and dissolved in a developing solution. Next, a semiconductor material is deposited to form a pattern, the resist is removed from support layer 13 (lift-off), and the semiconductor material is patterned. In this manner, first material layers 21 are formed. After first material layers 21 are formed, an activation treatment of first material layers 21 is performed by heating at about 800° C. When this activation treatment is performed, the oxide films are formed on surfaces of first material layers 21. A thickness of the oxide film is about 20 nm.

Next, insulating film 26 formed of $SiO_2$ is formed by lift-off. Next, after the pattern is formed with the resist, dry etching using a tetrafluorocarbon ($CF_4$) gas is performed. In this way, the oxide films formed on the surface of first material layers 21 are removed. By using the $CF_4$ gas as an etching gas, the oxide films formed as thick as the 20 nm can be made extremely thin. Further, fluorine in the etching gas can be contained in the oxide films remaining in first material layers 21 so as to have the above-described content ratio. In this manner, transition region 31a disposed between first region 28a and third region 29a so as to be in contact with each region and transition region 31b disposed between second region 28b and fourth region 29b so as to be in contact with each region are formed.

Next, a pattern for second material layers 22 is formed to form second material layers 22 by vapor deposition. Since the formation of each layer such as the formation of second material layers 22 is performed in the same manner as the formation of first material layer 21, the description thereof will be omitted.

After second material layers 22 are formed, activation treatment of second material layers 22 is performed by heating at about 550° C. Then, infrared-absorbing film 23 is formed, and first electrode 24 and second electrode 25 are formed. Next, recess 16 is formed in a central region of the substrate from the other main surface of the substrate located on a side of the substrate opposite to a side on which support layer 13 is located in the Z-axis direction. In this case, recess 16 is formed to be recessed from the other main surface of the substrate to second main surface 13a of support layer 13. In this manner, heat sink 14 formed of the substrate is formed to obtain optical sensor 11a.

The operation of optical sensor 11a will be described. When optical sensor 11a is irradiated with light such as an infrared ray, optical energy is converted into thermal energy by infrared-absorbing film 23. That is, the temperature of a portion where infrared-absorbing film 23 is disposed rises. On the other hand, since heat sink 14 is disposed outside inner edges 16a, 16b, 16c, and 16d, it is possible to prevent a rise in temperature. Here, when one of first material layer 21 is focused, second region 28b of first material layer 21 has a higher temperature than first region 28a of first material layer 21. That is, a temperature difference is formed between regions including both end portions in the longitudinal direction of the one of first material layer 21. Due to this temperature difference, an electrical potential difference is formed. Similarly, a temperature difference is formed between regions including both end portions of second material layer 22. Due to this temperature difference, an electrical potential difference is formed. Since the plurality of first material layers 21 and the plurality of second material layers 22 are connected in series to each other in such a manner that their polarities are alternately reversed, an electrical potential difference output from first electrode 24 and second electrode 25 is the sum of the electrical potential differences generated by the temperature differences in the plurality of first material layers 21 and the plurality of second material layers 22. By detecting a current flowing due to the electrical potential difference between first electrode 24 and second electrode 25, optical sensor 11*a* detects light, in this case, infrared light.

Optical sensor 11*a* includes transition region 31 configured as described above. Therefore, the resistance in optical sensor 11*a* can be reduced. Therefore, the noise of optical sensor 11*a* can be reduced.

In the present embodiment, transition region 31 includes the oxide film. Thus, the oxide film formed on the surface of the material layer can be used to form transition region 31 by including fluorine in the oxide film. Therefore, transition region 31 can be efficiently formed. Note that the thickness of transition region 31 can be adjusted by changing the dry etching time.

Figure 7:
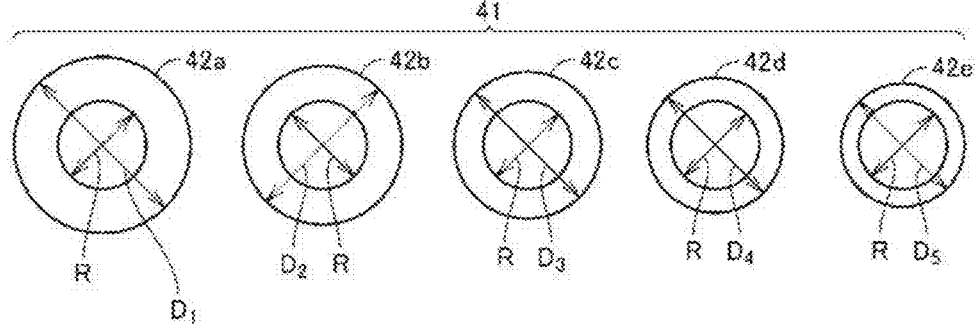
FIG. 7 shows a plurality of circular electrodes used for measurement of a contact resistivity.

A relationship between a contact resistivity, that is, a resistivity of a portion where first material layer 21 and second material layer 22 are electrically connected to each other, and the thickness of transition region 31 will be described. The thickness of transition region 31 was measured using a transmission electron microscope (TEM): "JEM-2100F" manufactured by JEOL Ltd. The contact resistivity was measured by a transmission line model (TLM) method. FIG. 7 shows a plurality of circular electrodes 41 used for measurement of the contact resistivity. Referring to FIG. 7, circular electrodes 42*a*, 42*b*, 42*c*, 42*d*, and 42*e* were used in which differences between outer diameters $D_1$, $D_2$, $D_3$, $D_4$, and $D_5$ and an inner diameter R were 50 μm, 40 μm, 30 μm, 20 μm, and 10 μm, respectively. The contact resistivity was measured by the TLM method using such circular electrodes 42*a*, 42*b*, 42*c*, 42*d*, and 42*e*.

Figure 8:
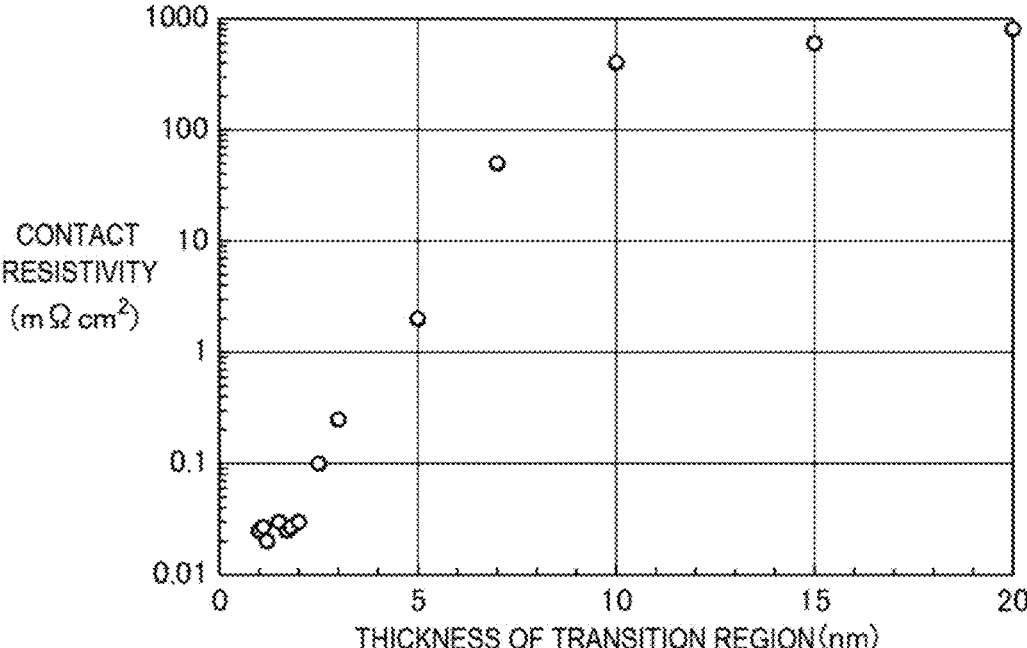
FIG. 8 is a graph showing a relationship between a contact resistivity and a thickness of the transition region in the first embodiment.
Figure 9:
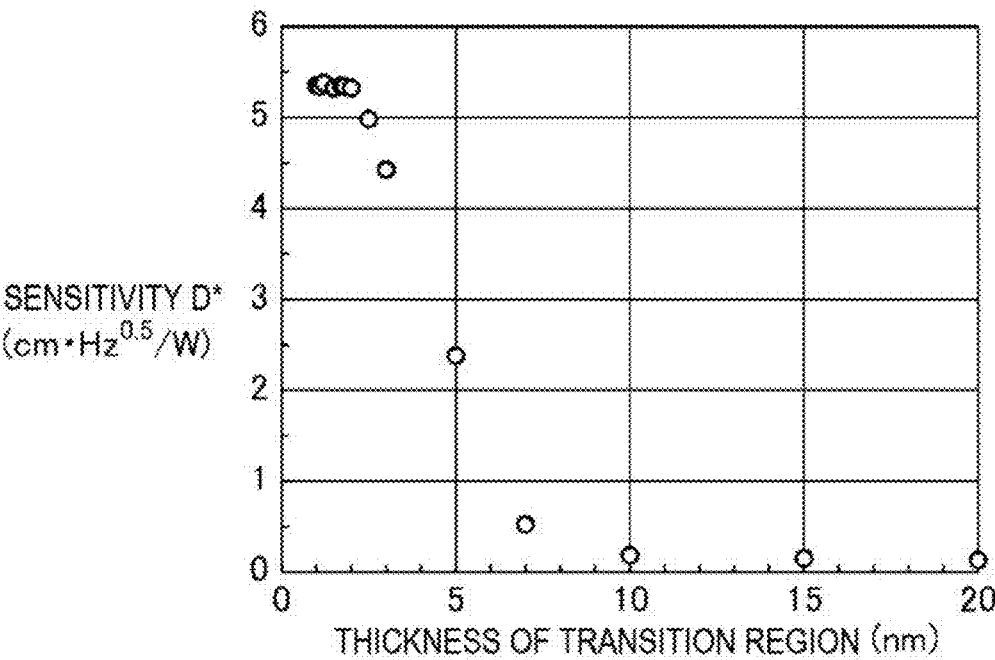
FIG. 9 is a graph showing a relationship between sensitivity D* of the optical sensor and the thickness of the transition region in the first embodiment.

FIG. 8 is a graph showing a relationship between the contact resistivity and the thickness of transition region 31 in the first embodiment. In FIG. 8, a horizontal axis represents a thickness (nm) of transition region 31 and a vertical axis represents the contact resistivity (mΩcm²). FIG. 9 is a graph showing a relationship between sensitivity D* of optical sensor 11*a* and the thickness of transition region 31 in the first embodiment. In FIG. 9, a horizontal axis represents the thickness (nm) of transition region 31 and a vertical axis represents sensitivity D* (cm·Hz$^{0.5}$/W). Table 1 shows the values corresponding to FIGS. 8 and 9.

TABLE 1

| THICKNESS OF OXIDE FILM (nm) | CONTACT RESISTIVITY (mΩcm²) | SENSITIVITY D* (cm · Hz$^{0.5}$/W) |
|---|---|---|
| 1.0 | 0.025 | 5.35 |
| 1.1 | 0.027 | 5.34 |
| 1.2 | 0.02 | 5.38 |
| 1.5 | 0.03 | 5.33 |
| 1.7 | 0.025 | 5.35 |
| 1.8 | 0.027 | 5.34 |
| 2.0 | 0.03 | 5.33 |
| 2.5 | 0.10 | 4.98 |
| 3.0 | 0.25 | 4.43 |
| 5.0 | 2.00 | 2.38 |
| 7.0 | 50 | 0.53 |
| 10 | 400 | 0.19 |
| 15 | 600 | 0.15 |
| 20 | 800 | 0.13 |

Referring to FIG. 8, when thickness $T_1$ of transition region 31 is 2 nm or less, the contact resistivity is less than 0.1 mΩcm², and the value of the contact resistivity is low.

Next, referring to FIG. 9, when thickness $T_1$ of transition region 31 is 2 nm or less, sensitivity D* is 5 cm·Hz$^{0.5}$/W or more and the sensitivity is good. In addition, transition region 31 containing a halogen can sufficiently function as a dopant and sufficiently contribute to a reduction in the contact resistivity as long as it is 0.1 nm or more. That is, by setting thickness $T_1$ of transition region 31 0.1 nm to 2 nm, thickness $T_1$ of transition region 31 can be more appropriately set, and the noise of optical sensor 11*a* can be reduced more reliably.

Figure 6:
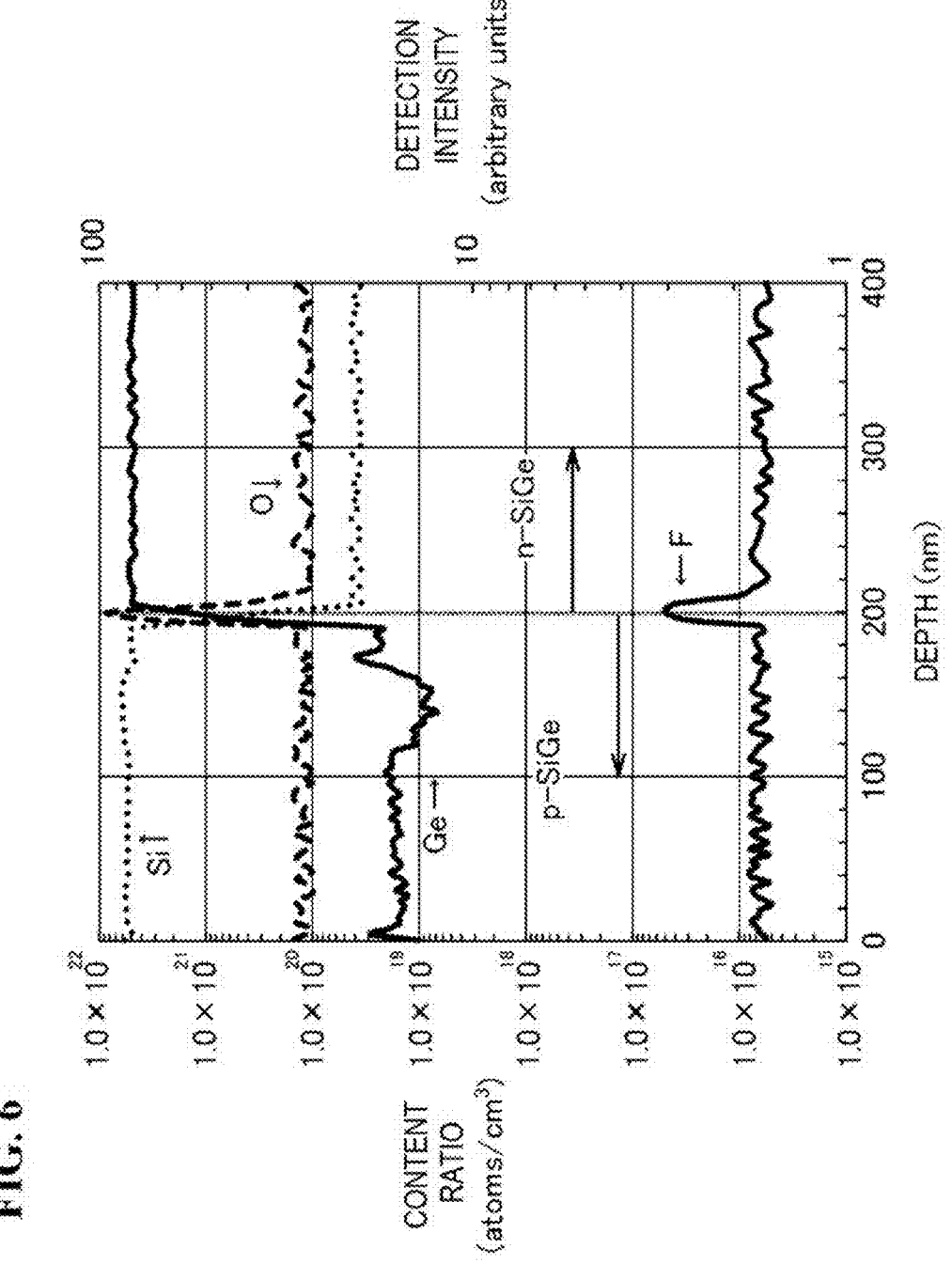
FIG. 6 is a graph showing the results of secondary ion mass spectrometry in regions where transition regions are disposed.

FIG. 6 is a graph in which thickness $T_1$ of transition region 31 corresponds to 2 nm. The dry etching time at this time was 2 minutes. Specifically, FIG. 6 is a graph showing the results of secondary ion mass spectrometry (SIMS) in regions where transition regions 31 are disposed. In FIG. 6, a horizontal axis represents a depth (nm) from the surface, a left vertical axis represents a content ratio (atoms/cm³) for oxygen (O) and fluorine (F), and a right vertical axis represents a detection intensity (arbitrary units) for silicon (Si) and germanium (Ge). O is indicated by a dashed line and F is indicated by a solid line. In addition, Si is indicated by a dashed line and Ge is indicated by a solid line. In the SIMS measurement. ADEPT-1010 manufactured by ULVAC, Inc. was used and $O_2$ and cesium (Cs) were used as ion species of a primary ion beam.

Referring to FIG. 6, the content ratio of O and F in a region near the depth of 200 nm where transition region 31 is disposed is higher than the content ratio of O and F in the other regions. In a region shallower than this region (on the left side of the graph), the intensity of Si is higher than the intensity of Ge. That is, it can be understood that the p-type SiGe which is second material layer 22 is disposed. In addition, in a region deeper than this region (on the right side of the graph), the intensity of Si is lower than the intensity of Ge. That is, it can be understood that the n-type SiGe which is first material layer 21 is disposed. In transition region 31 disposed between first material layer 21 and second material layer 22, the ratio of fluorine in the oxide film is $1.0 \times 10^{16}$ atoms/cm³ to $5.0 \times 10^{22}$ atoms/cm³.

Although the halogen contained in transition region 31 is fluorine in the above embodiment, the halogen contained in transition region 31 is not limited thereto, and may be any one of chlorine (Cl), bromine (Br), and iodine (I). These can be formed by changing the gas species of the dry etching.

The SiGe may have at least one of a nanocrystalline structure or an amorphous structure. By using such SiGe that forms first material layer 21 and second material layer 22, the noise in optical sensor 11*a* can be reduced more reliably. The SiGe, which is a constituent material of first material layer 21 and second material layer 22, may be formed as follows. For example, SiGe having an amorphous structure may be subjected to a heat treatment at a temperature of, for example, about 500° C. to form a nanocrystalline structure in a portion thereof. Also, the SiGe may have a nanocrystalline structure or an amorphous structure. In addition, the SiGe may be polycrystal. Such a polycrystalline SiGe is also suitably utilized in the optical sensor of the present disclosure. The crystallization rate of the polycrystal in the present disclosure is 99% or more. The crystallization rate was measured in the following manner. HORIBA LabRam HR-PL was used as an apparatus. As measurement conditions, a laser wave length was set to 532 nm and a laser power was set to 2.5 mW. As an analysis condition, a peak around 400 cm$^{-1}$ was analyzed. In the analysis, a Gaussian function and a pseudo-Voigt function were fitted. The Gaussian function G(x) is expressed by the following equation 3.

$$G(x) = A_g \exp\left(-\frac{4\ln 2}{W_g^2}(x - x_g)^2\right) \qquad \text{[Equation 3]}$$

The pseudo-Voigt function F(x) is expressed by the following equation 4.

$$F(x) = A_F \frac{m}{\pi}\left[\frac{W_f}{(x - x_f)^2 + W_f^2}\right] + A_F \frac{1 - m}{\sqrt{2\pi W_f}} \exp\left[-\frac{(x - x_f)^3}{2W_f^2}\right] \qquad \text{[Equation 4]}$$

The Gaussian function G(x): In variables $A_g$, $W_g$, and $x_g$, an initial value of $x_0$ was set to 400 cm$^{-1}$. The Pseudo-Voigt function F(x): In variables $A_f$, $W_f$, $x_f$, m, an initial value of $x_0$ was set to 380 cm$^{-1}$ and g was set to 0.5. Each of parameters was optimized by the least squares method, and each of the pseudo-Voigt function and the Gaussian function was integrated to obtain an area. The crystallization rate was calculated by an equation of crystallization rate=area derived using the pseudo-Voigt function/(area derived using the pseudo-Voigt function+area derived using the Gaussian function), considering that the area derived using the Gaussian function corresponds to amorphous and the area derived using the pseudo-Voigt function corresponds to crystalline structure.

Second Embodiment

Figure 10:
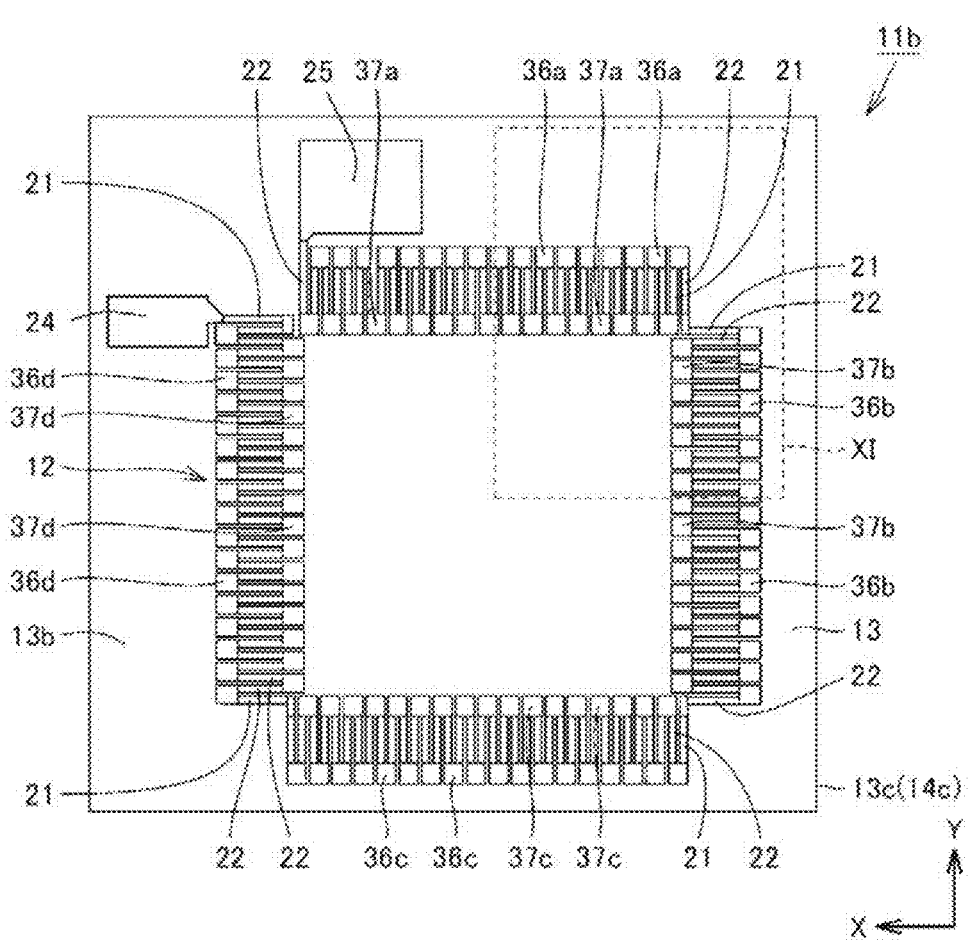
FIG. 10 is a schematic plan view of an appearance of an optical sensor according to a second embodiment.
Figure 11:
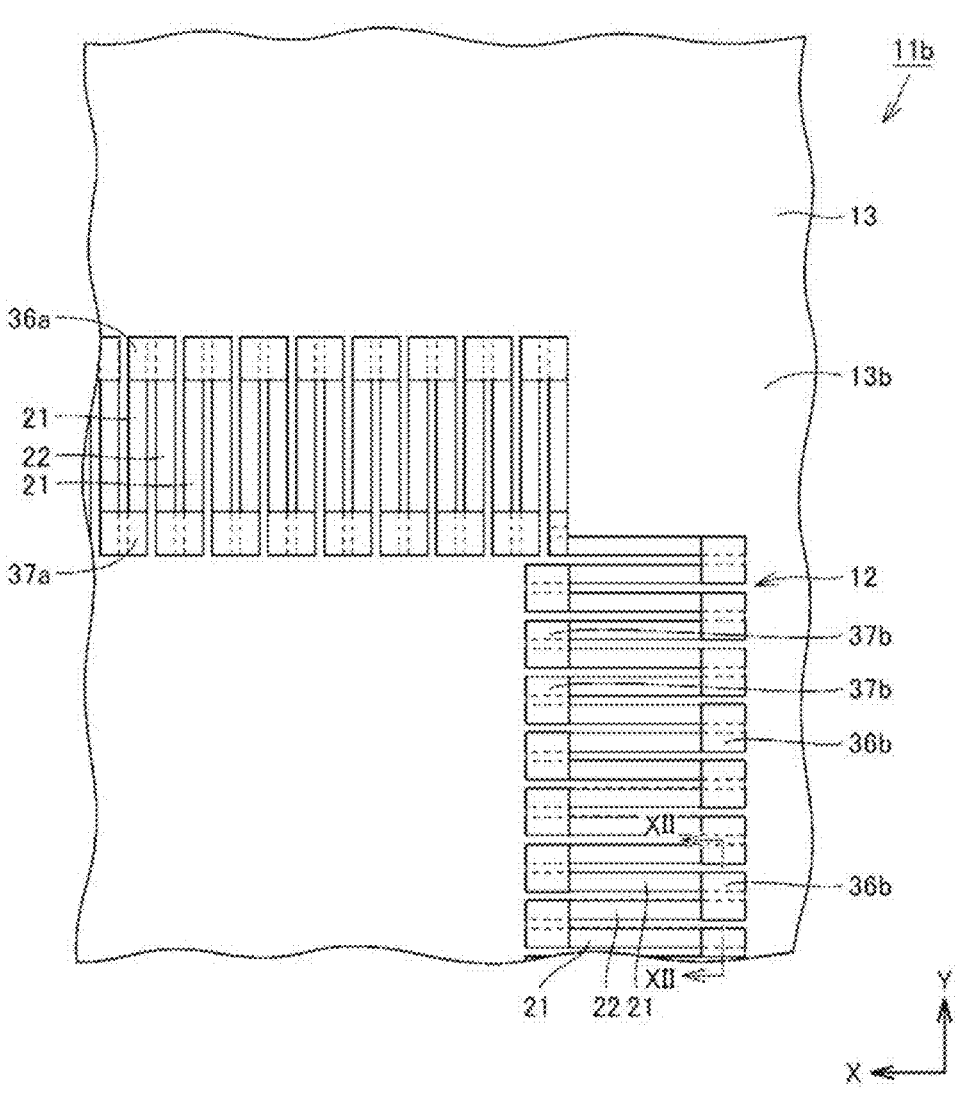
FIG. 11 is an enlarged schematic plan view showing a portion of the region XI of the optical sensor shown in FIG. 10.
Figure 12:
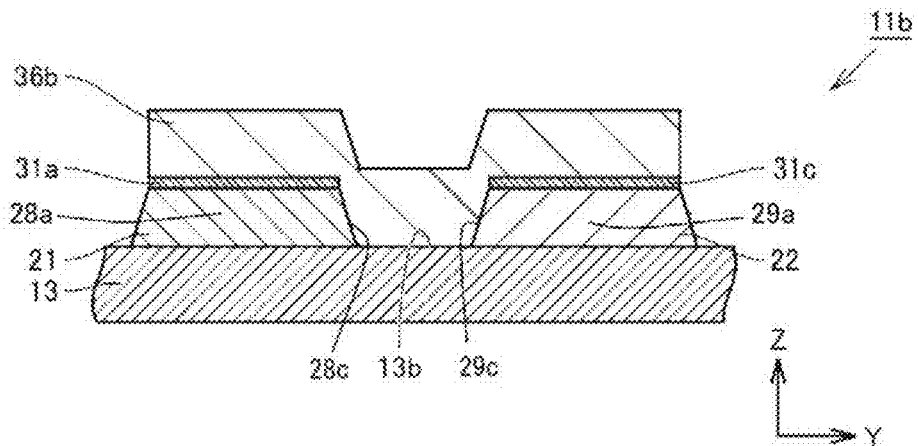
FIG. 12 is a schematic cross-sectional view showing a cross section along line XII-XII of FIG. 11.

A second embodiment which is another embodiment will be described. FIG. 10 is a schematic plan view of an appearance of an optical sensor according to the second embodiment. FIG. 11 is an enlarged schematic plan view showing a portion of the region XI of the optical sensor shown in FIG. 10. FIG. 12 is a schematic cross-sectional view showing a cross section along line XII-XII of FIG. 11. For ease of understanding, infrared-absorbing film 23 is not shown in FIGS. 10, 11, and 12. FIG. 10 is a view corresponding to FIG. 1. In the second embodiment, insulating film 26 may or may not be provided. Hereinafter, a case where insulating film 26 is not provided will be described.

Referring to FIGS. 10, 11 and 12, first material layers 21 and second material layers 22 included in an optical sensor 11b according to the second embodiment are not disposed to partially overlap each other in the Z-axis direction, but are disposed on the same plane, specifically, on first main surface 13b unlike optical sensor 11a according to the first embodiment. First material layers 21 which are elongated shaped and second material layers 22 which are elongated shaped are aligned such that the longitudinal direction is the X-axis direction or the Y-axis direction, respectively. First material layers 21 and second material layers 22 are alternately disposed so as to be adjacent to each other with a space therebetween. First material layer 21 has first region 28a including first end portion 28c and second region 28b including second end portion 28d located opposite to first end portion 28c in a longitudinal direction. Second material layer 22 has third region 29a including third end portion 29c and fourth region 29b including fourth end portion 29d located opposite to third end portion 29c in a longitudinal direction. Infrared-absorbing film 23 exposes first region 28a of first material layer 21 and third region 29a of second material layer 22. Infrared-absorbing film 23 covers second region 28b of first material layer 21 and fourth region 29b of second material layer 22. That is, second region 28b and fourth region 29b overlap infrared-absorbing film 23 in the Z-axis direction.

Thermoelectric conversion material portion 12 includes transition regions 31 (31a, 31b, 31c, and 31d) containing a halogen. Transition regions 31a, 31c electrically connect first region 28a and third region 29a. Transition regions 31a, 31c are disposed in contact with first region 28a and third region 29a, respectively. Transition regions 31b, 31d electrically connect second region 28b and fourth region 29b. Transition regions 31b, 31d are disposed in contact with second region 28b and fourth region 29b, respectively.

Thermoelectric conversion material portion 12 includes third material layers 36 (36a, 36b, 36c, 36d), and 37 (37a, 37b, 37c, 37d) formed of metal. Examples of the metal forming third material layers 36, 37 include Ni(nickel), W, Mo, Ti, Au, Pd, Ge, Hf, and Al. Third material layer 36 connects first region 28a and third region 29a to each other so as to span adjacent first region 28a and third region 29a when viewed in the Z-axis direction. Third material layer 36 is disposed in contact with transition region 31a overlapping first region 28a, transition region 31c overlapping third region 29a, first end portion 28c, and third end portion 29c.

A third material layer 37 connects second region 28b and fourth region 29b to each other so as to span adjacent second region 28b and fourth region 29b when viewed in the Z-axis direction. Third material layer 37 is disposed in contact with transition region 31b overlapping second region 28b, transition region 31d overlapping fourth region 29b, second end portion 28d, and fourth end portion 29d.

According to the present embodiment, the conductivity between first material layer 21 and second material layer 22 can be improved by third material layers 36, 37 having good conductivity. Therefore, the noise of optical sensor 11b can be reduced. Noted that, transition region 31 in the second embodiment is formed by forming first material layer 21 and second material layer 22 and then removing the oxide film formed on the surface of first material layer 21 and the surface of second material layer 22 by dry etching.

Figure 13:
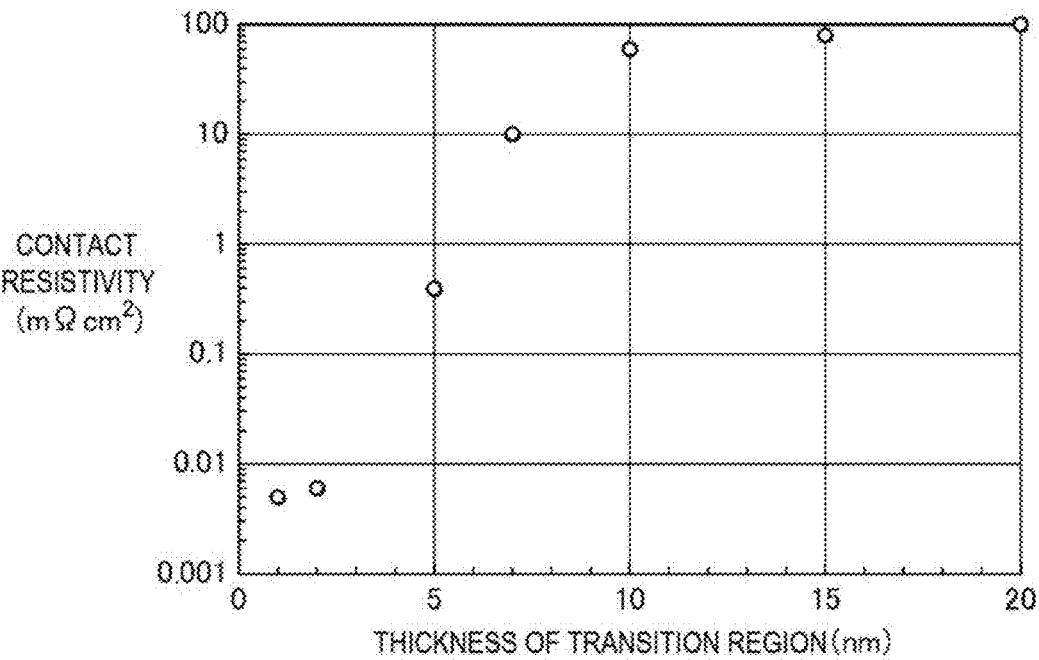
FIG. 13 is a graph showing a relationship between a contact resistivity and a thickness of a transition region in the second embodiment.

FIG. 13 is a graph showing a relationship between a contact resistivity and a thickness of transition region 31 in the second embodiment. In FIG. 13, a horizontal axis represents a thickness (nm) of transition region 31 and a vertical axis represents a contact resistivity (mΩcm$^2$). Table 2 shows the values of FIG. 13. As an etching gas, a tetrafluorocarbon (CF$_4$) gas was used.

TABLE 2

| THICKNESS OF OXIDE FILM (nm) | CONTACT RESISTIVITY (mΩcm$^2$) |
|---|---|
| 1.0 | 0.005 |
| 2.0 | 0.006 |
| 5.0 | 0.40 |
| 7.0 | 10 |
| 10 | 60 |
| 15 | 80 |
| 20 | 100 |

Referring to FIG. 13, when thickness $T_1$ of transition region 31 is 2 nm or less, the contact resistivity is less than 0.1 mΩcm$^2$, further less than 0.01 mΩcm$^2$, and the value of the contact resistivity becomes extremely low. Therefore, by using such optical sensor 11b, noise can be further reduced.

OTHER EMBODIMENTS

In the above-described embodiment, the first conductivity type is an n-type, and the n-type thermoelectric conversion material is used for the first material layers. The conductivity type different from the first conductivity type is a p-type, and the p-type thermoelectric conversion material is used for the second material layer. However, the present disclosure is not limited thereto. The first conductivity type may be a p-type, and the p-type thermoelectric conversion material may be used for the first material layer. The conductivity type different from the first conductivity type may be an n-type, and the n-type thermoelectric conversion material may be used for the second material layer.

Although the heat sink has a shape with the inside hollowed out in the above-described embodiment, the present invention is not limited thereto. For example, the heat sink may have a configuration in which the heat sink is formed in a grid shape when viewed in the Z-axis direction, and a plurality of rectangular support layers may be respectively disposed in regions corresponding to so-called windows of the grid-shaped heat sink. Specifically, for example, a configuration may be employed in which the plurality of rectangular support layers, which are thin portions, are disposed at intervals, and the heat sink is disposed on a region between the support layers. This also enables reduction in the noise. Such a configuration is employed, for example, when the optical sensor is used as an array sensor.

In the optical sensor, the transition region may not include an oxide film. That is, the transition region may be formed of SiGe containing only a halogen.

It should be understood that the embodiments disclosed in the present disclosure are merely illustrative and non-restrictive in every respect. The scope of the present disclosure is defined by the claims rather than the description above, and is intended to include any modifications within the scope and meaning equivalent to the claims.

REFERENCE SIGNS LIST 11a, 11b optical sensor
12 thermoelectric conversion material portion
13 support layer
13a second main surface
13b first main surface
13c, 14c, 23a, 23b, 23c, 23d outer edge
14 heat sink
14a, 14b surface
14d inner circumferential surface
15 region
16 recess
16a, 16b, 16c, 16d inner edge
21, 21a, 21b, 21c, 21d first material layer
22, 22a, 22b, 22c, 22d second material layer
23 infrared-absorbing film (light-absorbing film)
24 first electrode
25 second electrode
26 insulating film
28a first region
28b second region
28c first end portion
28d second end portion
29a third region
29b fourth region
29c third end portion
29d fourth end portion
31, 31a, 31b, 31c, 31d transition region
32a, 35a back surface
33a, 34a front surface
36, 36a, 36b, 36c, 36d, 37, 37a, 37b, 37c, 37d third material layer 41, 42a, 42b, 42c, 42d, 42e circular electrode
$T_1$ thickness
D* sensitivity
$D_1$, $D_2$, $D_3$, $D_4$, $D_5$ outer diameter
R inner diameter
X, Y, Z axis direction

The invention claimed is:

1. An optical sensor comprising:
a support layer having a first main surface and a second main surface opposite to the first main surface;
a first electrode disposed on the first main surface;
a second electrode spaced from the first electrode and disposed on the first main surface;
a thermoelectric conversion material portion disposed on the first main surface;
a heat sink disposed on the second main surface; and
a light-absorbing film configured to convert received light into thermal energy,
wherein the thermoelectric conversion material portion includes a plurality of first material layers that each have an elongated shape, are each made of SiGe having a first conductivity type, and are each configured to convert thermal energy into electric energy, a plurality of second material layers that each have an elongated shape, are made of SiGe having a second conductivity type different from the first conductivity type, and are configured to convert thermal energy into electric energy, and a plurality of transition regions containing a halogen,
each of the plurality of first material layers includes
a first region including a first end portion and a second region including a second end portion located opposite to the first end portion, the second region overlapping the light-absorbing film when viewed in a direction perpendicular to the first main surface,
each of the plurality of second material layers includes
a third region including a third end portion and a fourth region including a fourth end portion located opposite to the third end portion, the fourth region overlapping the light-absorbing film when viewed in the direction perpendicular to the first main surface,
the plurality of transition regions electrically connect the first region and the third region to each other and the second region and the fourth region to each other,
the thermoelectric conversion material portion is formed such that each of the plurality of first material layers and each of the plurality of second material layers are electrically connected to each other in series in an alternate manner,
the first region at a front end of the thermoelectric conversion material portion is electrically connected to the first electrode, and
the third region at a tail end of the thermoelectric conversion material portion is electrically connected to the second electrode.

2. The optical sensor according to claim 1, wherein when viewed in the direction perpendicular to the first main surface, the first region and the third region overlap each other, and the second region and the fourth region overlap each other, and
the plurality of transition regions are disposed between the first region and the third region and between the second region and the fourth region so as to be in contact with each region.

3. The optical sensor according to claim 1, wherein the thermoelectric conversion material portion includes a plurality of third material layers made of a metal, when viewed in the direction perpendicular to the first main surface, the first region and the third region are disposed so as to be adjacent to each other, and the second region and the fourth region are disposed so as to be adjacent to each other, the plurality of transition regions are disposed in contact with the first region, the second region, the third region, and the fourth region, and the plurality of third material layers, when viewed in the direction perpendicular to the first main surface, connect the first region and the third region to each other so as to span the first region and the third region, and connect the second region and the fourth region to each other so as to span the second region and the fourth region.

4. The optical sensor according to claim 1, wherein a content ratio of the halogen in the plurality of transition regions is $1.0 \times 10^{16}$ atoms/cm$^3$ to $5.0 \times 10^{22}$ atoms/cm$^3$.

5. The optical sensor according to claim 1, wherein each of the plurality of transition regions has a thickness of 0.1 nm to 2 nm.

6. The optical sensor according to claim 1, wherein the halogen is fluorine.

7. The optical sensor according to claim 1, wherein the SiGe having the first conductivity type and the SiGe having the second conductivity type have at least one of a nanocrystalline structure or an amorphous structure.

8. The optical sensor according to claim 1, wherein the SiGe having the first conductivity type and the SiGe having the second conductivity type are each a polycrystal.

9. The optical sensor according to claim 1, wherein the plurality of transition regions include an oxide film of the SiGe having the first conductivity type or an oxide film of the SiGe having the second conductivity type.

* * * * *